United States Patent [19]

Breuninger

[11] Patent Number: 4,858,178

[45] Date of Patent: Aug. 15, 1989

[54] PROGRAMMABLE SEQUENCE GENERATOR

[75] Inventor: Robert K. Breuninger, Garland, Tex.

[73] Assignee: Texas Instruments Incorporated, Dallas, Tex.

[21] Appl. No.: 919,925

[22] Filed: Sep. 30, 1986

[51] Int. Cl.⁴ ............................................. G06F 13/00
[52] U.S. Cl. ................................. 364/900; 364/947.1; 364/716; 307/465
[58] Field of Search ... 364/200 MS File, 900 MS File, 364/716; 307/465

[56] References Cited

U.S. PATENT DOCUMENTS

| | | | |
|---|---|---|---|
| 4,468,735 | 8/1984 | Gotze et al. | 364/200 |
| 4,506,341 | 3/1985 | Kalter et al. | 364/716 |
| 4,631,665 | 12/1986 | Yokouchi | 364/200 |
| 4,661,922 | 4/1987 | Thierbach | 364/900 |

Primary Examiner—Gareth D. Shaw
Assistant Examiner—Debra A. Chun
Attorney, Agent, or Firm—George L. Craig; Leo N. Heiting; Melvin Sharp

[57] ABSTRACT

A programmable sequence generator comprises a combinatorial logic matrix (10,12) and an on-chip timer (24) having count lines (26) coupled as inputs to the logic matrix (10). Combinatorial logic functions may be programmed into the matrix having as variables external inputs (14), a count number represented by the count lines (26) and internal inputs (48) fed back from outputs of the logic matrix (12). In a preferred embodiment, state registers (46) are provided, such that the programmable sequence generator can operate in any one of a plurality of different states. The programmable sequence generator can be configured as a waveform generator (92), a refresh timer (94) or a dynamic memory timing controller (96), among other programmable logic applications.

11 Claims, 7 Drawing Sheets

PROGRAMMABLE SEQUENCE GENERATOR

TECHNICAL FIELD OF THE INVENTION

This invention relates to logic arrays, and more particularly relates to field programmable logic matrices capable of generating timing sequences.

BACKGROUND OF THE INVENTION

Programmable logic arrays, conventionally known as PALs, a trademark of Monolithic Memories, Inc., are a family of logic devices known in the art for implementing combinatorial logic functions. A PAL in general has a programmable AND matrix and a nonprogrammable OR matrix, or vice versa, such that the programmer has a fairly limited flexibility in the logic functions which may be implemented.

More recently, a field programmable logic sequencer (FPLS) has been developed that includes an AND subarray and an OR subarray. The FPLS has a plurality of state registers connected to outputs of the OR subarray, the outputs of the state registers being fed back into the network as inputs of the product subarray. The FPLS thus can store a state for use in further combinatorial logic functions, and, through the programming of many combinatorial sequence product terms in the AND subarray, can be used to generate a plurality of different clock cycles on the outputs of the FPLS.

Using conventional FPLS's, timing sequences are constructed such that a separate programmable product term defines outputs for every triggering transition of an input clock pulse. This requires a wasteful number of programmable product terms that could be used for other purposes. If an external counter is used to reference the produced clock sequences, a number of external inputs and outputs of the FPLS must be dedicated.

A need has thus arisen in the industry for a more efficient way to produce timing sequences from a logic matrix, as well as for a versatile single logic chip that can be used for both state machine and waveform generating applications.

SUMMARY OF THE INVENTION

Preferred embodiments of the present invention include a field programmable sequence generator (PSG) having programmable product and sum matrices. The outputs of the product matrix are coupled to inputs of the sum matrix. A counter, such as a binary counter, outputs a count on a plurality of count lines which are coupled to inputs of the product matrix. The product matrix also comprises a plurality of external input lines. The programmable sequence generator of the invention may also include a plurality of state registers which can store one or more states for feedback as inputs into the product matrix, the state registers having inputs coupled to respective selected outputs of the sum matrix. At least some of the outputs of the sum matrix are coupled to external outputs of the PSG, which preferably may be selected for registered or unregistered operation.

In a preferred embodiment, a sum term circuit programmed into the sum matrix is used for resetting the counter to zero, and another one is employed for a count/hold function, whereby the counter can be directed to pause in its count and then to resume the count. An architectural fuse associated with the clock source can be selected to trigger either on a negative or a positive transition.

The programmable sequence generator can be used to output a plurality of clock sequences, the clock sequences each being referenced to a count cycle produced by the binary counter. Alternate output sequences can be selected according to combinatorial logic functions of the count cycle and the external inputs. The state registers can be used to define a plurality of states, each state being associated with a count cycle within which certain preselected output sequences will repeat. In this way the programmable sequence generator can exhibit different count cycles and different output function sequences each referenced to a selected count cycle, according to which state it is operating in. The binary counter can be expanded to include further significant digits by use of one or more state registers. The programmable sequence generator can be configured as a clock generator, a refresh timer, and a memory timing controller or other state machine, among other programmable logic applications, and provides an extremely flexible building block for designers of systems incorporating field programmable logic.

BRIEF DESCRIPTION OF THE DRAWINGS

A more complete understanding of the invention may be had by reference to the following detailed description when taken in conjunction with the accompanying drawings wherein.

DESCRIPTION OF THE INVENTION

Figure 1:
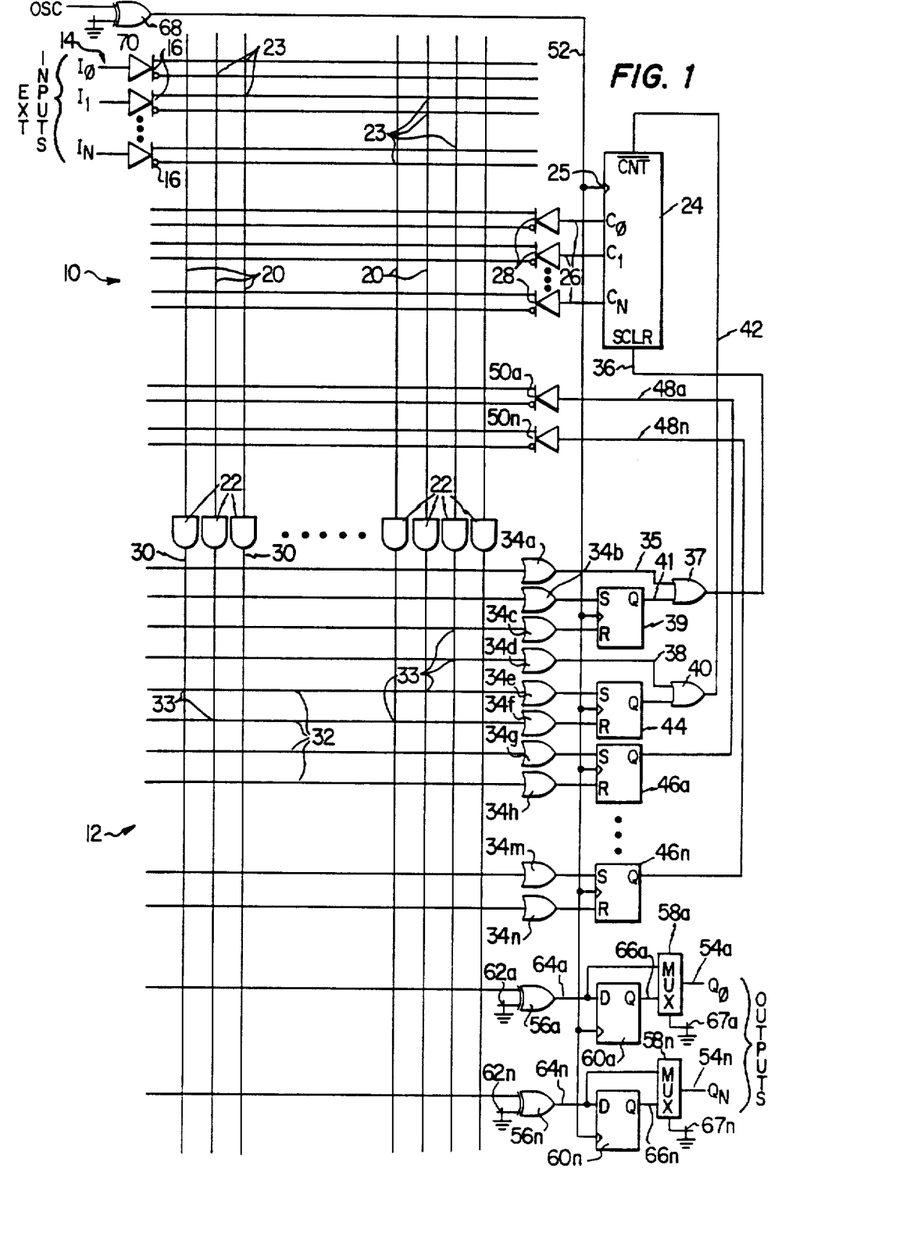
FIG. 1 is a simplified electrical schematic diagram of a programmable sequence generator according to the invention.

Turning now to FIG. 1 of the drawings, a simplified electrical schematic diagram of a programmable sequence generator (PSG) according to the invention is illustrated. The PSG has a plurality of field-programmable elements, including a product or AND matrix 10 and a sum or OR matrix 12. Product matrix 10 could also be a NAND matrix and sum matrix 12 could also be a NOR matrix. Product matrix 10 has a plurality of external inputs 14. Each input 14 is inverted at inverter 16, such that both a true and a complement input for each external input line are available for use as inputs. Product matrix 10 has a plurality of AND or product term lines 20 associated with each product or AND gate 22. Here, only one product term line 20 is shown for each AND gate 22 for purposes of clarity, but the illustrated line actually represents several inputs to each AND gate 22, such as sixteen inputs. Each group of product term lines 20 that feed into a respective AND gate 22 may be programmed to form a product term circuit, which will then embody a product term. Inputs 14 may be selectively connected to product term lines 20 by keeping a fuse intact at any of a plurality of intersections 23, at which the product term lines 20 and the input lines cross. The fuses at the remaining intersections of a connected product term line are blown open.

In most applications, the sixteen inputs to any one AND gate 22 are not all employed. Therefore, the product term lines 20 which are not used are pulled up to a high voltage, such that the inputs on these lines will always be in a high condition. Thus, the logical function provided by each AND gate 22 is a product term of the values of selected input lines connected at selected intersections 23 along the length of the gate's product term lines 20.

An important feature of the invention is a counter 24, which is preferably a binary counter. Binary counter 24 is operable to increment a counted binary number upon the receipt of a clock signal at its clock input 25. The current counted binary number is represented on a plurality of count lines 26, which are selectively connected as internal input lines to product term lines 20. Like the other inputs to product matrix 10, count lines 26 are inverted at inverters 28 so that the complements of their values are available for use in programming combinatorial logic.

In a preferred embodiment, the programmable sequence generator of the invention has thirteen external inputs 14, and six count lines or inputs 26. There are preferably eighty sets of AND term lines 20 to which the inputs of the PSG, both internal and external, can make connection.

The value produced by a product term circuit as formed by each group of product term lines 20 appears on an output 30 of a respective AND gate 22. Product term output lines 30 are selectively coupled as inputs to sum matrix 12. Product term output lines 30 intersect a plurality of sum term or OR term lines 32 at intersections 33. Connections are selectively made at intersections 33 using conventional PLA technology by leaving fuses intact at these locations. The remaining locations throughout the AND matrix 10 and the OR matrix 12 are blown open. Each sum term line 32 actually represents a bundle of inputs to a corresponding OR gate 34a-n, which bundle may be programmed as a sum term circuit that embodies a sum term having selected product terms as its variables.

In order to program any particular combinatorial function, the operator programs one or more product term lines 20, which then may be used in forming one or more sum term circuits on lines 32. Any unused lines are pulled to ground in order to keep the OR function represented by gate 34 valid.

The outputs from OR gates 34a-n have various functions, some of which provide internal feedback and others of which are coupled to the outputs of the PSG chip.

The output from the topmost OR gate 34a operates as an unregistered synchronous clear, or SCLR, line 35. Unregistered SCLR line 35 serves as an input into an SCLR OR gate 37. An SCLR line 36 is output from OR gate 37 and is connected to an SCLR terminal of counter 24. A high signal on line 36 will cause binary counter 24 to reset back to zero on the next triggering clock transition, and counter 24 will then begin counting from zero again.

A second OR gate 34b has an output connected to the "S" input of a synchronous state register 39, which can be an S-R flipflop. A third OR gate 34c has an output connected to the "R" input of register 39. Register 39 can hold a synchronous clear state variable that controls the output on a registered SCLR line 41. The user can thus select for either a registered or a nonregistered SCLR function.

While not employed in the examples which follow, a registered SCLR function is useful in certain applications where a faster operation is desirable. The registered SCLR function requires the use of an additional product term circuit 20, but provides a maximum performance. Where registered operation is selected, SCLR register 39 is set high upon receiving a high signal at its "S" input from gate 34b. On the next active clock edge, register 39 is reset. At the same time, counter 24 is reset to zero. Thus, the set-up time for the SCLR function is performed during the previous clock signal. When using the unregistered SCLR function from gate 34a, the set-up time must be added to the Fmax equation, or the time equation that determines the overall speed of the chip. A tradeoff therefore exists between speed and the use of another product circuit 20.

The fourth OR gate 34d has as its output a nonregistered count/hold signal line 38. Line 38 is input into a count/hold OR gate 40. OR gate 40 has an output line 42 that is fed back to the binary counter 24. In the illustrated embodiment, a low signal on count/hold line 42 will cause binary counter 24 to resume counting; a high signal on line 42 will cause binary counter 24 to pause until a low signal on line 42 is registered. This arrangement is preferred because a "virgin" part will be counter-active.

A fifth OR gate 34e has an output connected to the "S" input of a synchronous state register or S-R flipflop 44. Likewise, a sixth OR gate 34f has an output that serves as an input into the "R" input of flipflop 44. Flipflop or state register 44 stores a count/hold state variable that determines whether binary counter 24 should continue counting or should pause. The designer can thus select between registered or unregistered count/hold functions.

Other OR gates 34g-n serve as R and S inputs to a plurality of non-dedicated state registers 46a-n. Although only two state registers 46a and 46n are shown for purposes of clarity, a preferred embodiment of the programmable sequence generator has eight such state registers, which can also be J/K flipflops instead of S/R flipflops. Each state register 46a-n has an output line 48a-n that is fed back as an input to the product matrix 10. A branch of each line 48a-n is inverted at 50a-n so that either the true value on line 48a-n or its complement can be used in programming selected combinatorial logic functions. Each state register 44 and 46a-n is controlled by a clock source line 52, which also synchronously controls counter 24.

Sum matrix 12 is coupled to a plurality of external outputs 54a-n. In one embodiment each external output line 54a-n is coupled to a respective exclusive OR (XOR) gate 56a-n; via a multiplexer 58a-n and an output register 60a-n. In this embodiment, each XOR gate 56a-n has an architectural fuse 62a-n that allows selection between true or complement; output on line 64a-n. Selection is made on this and other architectural fuses described herein by either blowing or keeping intact the fuse. Lines 64a-n serve as inputs to output registers 60a-n, and also as an unregistered input into multiplexers 58a-n. Output registers 60a-n have output lines 66a-n that serve as second inputs to respective multiplexer 58a-n. Each multiplexer 58a-n has an architectural fuse 67a-n that selects between registered and nonregistered output on external output line 54a-n. In a preferred embodiment, there are eight output registers 60a-h and associated multiplexers 58a-h, although only two are shown here for purposes of clarity.

The signal on clock source line 52 is produced by an XOR gate 68 that has an architectural fuse 70 as one of its inputs. Upon blowing fuse 70 or keeping it intact, the designer can select between a clock pulse triggering on a positive or negative transition.

Although not shown, each output line 54 may be connected to a 3-state buffer having a high-impedance select line. When a high-impedance state is selected for, the output of the buffer will indicate that the PSG is disabled. The high-impedance select lines may be ganged together to the output of a NAND gate, one input of which may be connected to an external input line 14, and the other input of which may be connected to an architectural fuse. When this architectural fuse is blown, a low signal on the connected input external input line 14 will enable all outputs 54. A high signal on the connected external input line 14 will disable all outputs 54. When the architectural fuse is left intact, the outputs will stay enabled no matter what the value on the connected input line.

Figure 2:
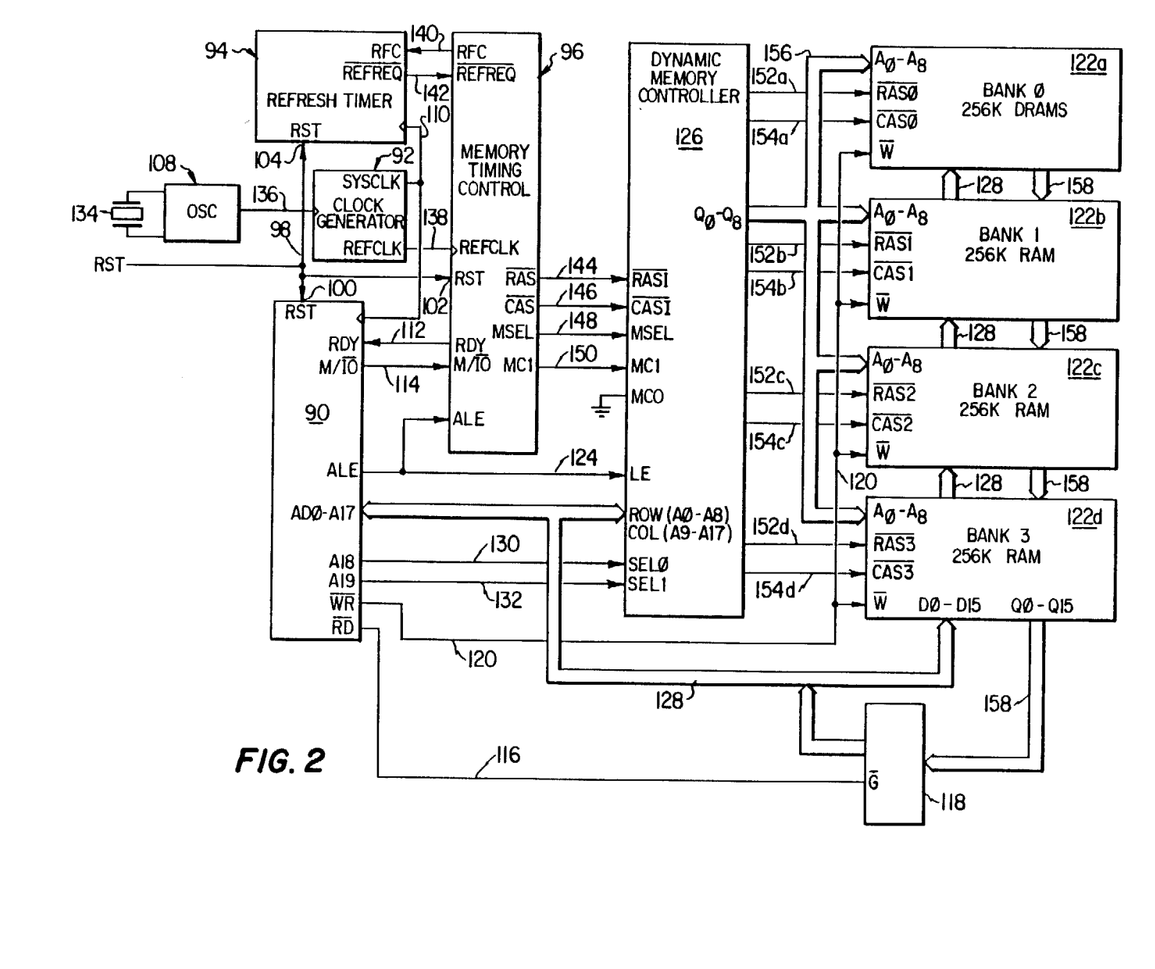
FIG. 2 is an electrical schematic diagram of a microprocessor-based memory system incorporating several embodiments of a programmable sequence generator according to the invention.

Turning now to FIG. 2, a memory system in which several configurations of the invention can be employed is schematically illustrated. The illustrated diagram is that of a memory system of a microcomputer based on an Intel 8086 processor chip 90. The programmable sequence generator of the invention can be programmed to function as a clock generator, indicated at 92; a refresh timer, indicated at 94; or a memory timing controller, indicated at 96.

A RESET line 98 connects processor 90 with a reset input 100 of processor 90, a reset input 102 of memory timing controller 96, a reset input 104 of refresh timer 94. The RESET signal is generated from system reset circuitry (not shown). Processor 90 has a system clock input line 110 that is input from clock generator 92. System clock line 110 is further input to refresh timer 94. A READY signal is input on line 112 to processor 90 from memory timing controller 96. A memory/input-output select signal line 114 (M/$\overline{IO}$) is output to memory timing controller 96. A read ($\overline{RD}$) signal line 116 is connected from processor 90 to a bus driver 118, here implemented by two SN74AS240 chips. A write ($\overline{WR}$) signal line 120 is output from processor 90 to each of four banks of dynamic random access memories 122a-d, each bank in this embodiment comprising sixteen 256K dynamic random access memory chips. An address latch enable (ALE) signal line 124 is output from processor 90 to memory timing controller 96 and a dynamic memory controller 126. Processor 90 is further connected to a multiplexed address and data bus 128, and further has SEL 0 and SEL 1 signal lines 130 and 132 which are connected to inputs of dynamic memory controller 126 in order to select which bank 122a-d is to be accessed.

Clock source chip 108 is connected to a crystal 134. This chip provides an oscillator signal on line 136 that is input to clock generator 92.

Clock generator 92 has a system clock output line 110, and a reference clock output line 138. The reference clock output line is connected as an input to memory timing controller 96.

Refresh timer 94 has inputs comprising a RESET signal on line 98, a system clock (SYSCLK) signal on line 110, and a refresh cycle complete (RFC) signal on line 140. It has a refresh request signal ($\overline{REFREQ}$) that is output on line 142 to memory timing 96.

Memory timing controller 96 has inputs comprising the previously described lines 142, 138, 102, 114, and 124 and includes among its outputs RDY line 112 as previously described. Memory timing controller 96 has as further outputs the RFC signal line 140, row address strobe ($\overline{RAS}$) line 144, column address strobe ($\overline{CAS}$) line 146, a multiplexer row/column select (MSEL) signal line 148, and a mode control (MC1) signal line 150 that operates to select between a refresh or a normal access mode. $\overline{RAS}$ line 144, $\overline{CAS}$ line 146, MSEL line 148, and MC1 line 150 are connected to respective inputs of dynamic memory controller 126.

Dynamic memory controller 126 controls the access to DRAM banks 122a-d. For DRAM banks 122a-d, dynamic memory controller 126 provides the following inputs: a $\overline{RASn}$ signal line 152a-d, $\overline{CASn}$ signal lines 154a-d, and an address bus 156. Bus 128 is connected as a data input bus to each of dynamic RAM banks 122a-d, and a data output bus 158 connects each of the DRAM banks back to bus driver 118.

Figure 3:
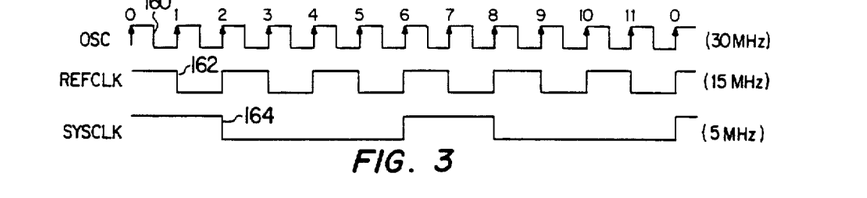
FIG. 3 is a timing diagram showing timing requirements for a waveform generator configuration of the programmable sequence generator shown in FIG. 1.

Having now described an environment in which the programmable sequence generator of the invention may be advantageously employed, reference is made to FIG. 3, which illustrates a timing diagram showing the oscillator input and the required outputs of clock generator 92 of FIG. 2.

Clock generator 92 receives an oscillator signal 160 which has in the illustrated embodiment a frequency of 30 megahertz. Clock generator 92 is required to generate a reference clock signal 162 that operates at 15 megahertz and has a 50% duty cycle. Further, a system clock signal 164 must be generated that has a frequency of five megahertz with a 33.33% high/66.67% low duty cycle. Reference clock pulse 162 must be in close phase with system clock pulse 164 in order to guarantee synchronous operation of the memory system shown in FIG. 2.

For reference, the upward transitions of oscillator signal 160 have been marked off in order to determine when transitions of the reference clock 162 and the system clock signal 164 are required to be produced. It can be seen that signals 162 and 164 repeat themselves in an eleven-upward-transition cycle as referenced to oscillator signal 160.

Figure 4:
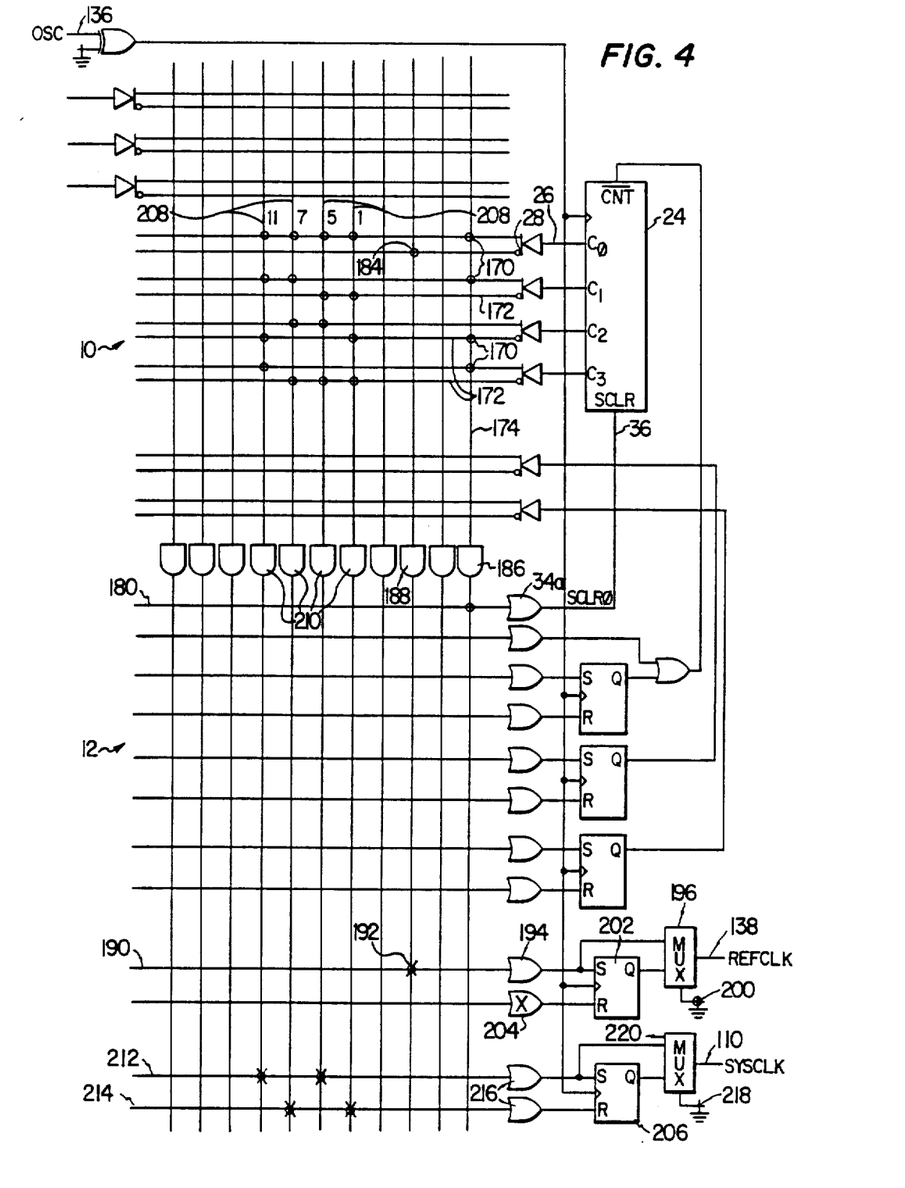
FIG. 4 is a simplified electrical schematic diagram of a programmable sequence generator similar to that shown in FIG. 1, as programmed for the generation of the waveforms illustrated in FIG. 3.

Turning now to FIG. 4, a simplified electrical schematic diagram of a programmable sequence generator programmed to embody the clock generator 92 is illustrated, with like numbers being used for like and corresponding parts previously described. As in FIG. 1, the number of external inputs, feedback inputs, state registers, AND gates and output registers and OR gates has been reduced for purposes of clarity. Further, counter 24 has in a preferred physical embodiment six stages, with six respective sets of count lines 28 and 172, but is here shown only with four such stages, again, for purposes of clarity.

The first step in programming the PSG to behave as the clock generator specified is to configure the matrices 10 and 12 such that counter 24 will reset back to zero every time it reaches count 11, thus defining a count cycle in which reference clock signal 162 and system clock signal 164 will repeat. At points 170, the fuses are left intact, thus connecting either count lines 26 or their complement lines 172 with a set of product term lines, represented schematically by line 174. Then, when the signals on count lines 26 represent decimal 11 ($=1011_2$), a high signal will be generated by AND gate 186. The output of AND gate 186 is connected to a synchronous clear sum term line 180 by leaving fuse 198 intact. The high value produced by gate 186 will thus be fed as an input to SCLR OR gate 34a. This high output will cause a signal on line 36 to be high, which will in turn cause the counter to reset back to zero, thus establishing an 11-count cycle.

Once the count cycle has been programmed, the other cycles may be programmed by referring each upward transition of the other cycles to a particular count in the 11-count cycle. Referring back to FIG. 3, it will be noticed that for reference clock signal 162 a transition is required for every two transitions of oscillator signal 160. Positive transitions of reference clock pulse 162 occur at transitions 0, 2, 4, 6, 8 and 10. The binary representation of each of these numbers has a "0" for its ones digit. Therefore, referring back to FIG. 4, a fuse at location 184 is left intact. The remaining product term lines feeding into reference clock AND gate 188 are effectively disabled by being pulled up to a "1" value. Therefore, the output of AND gate 188 will be a "1" every time count line 26 has a "0" bit on it, which occurs at counts 0, 2, 4, 6, 8 and 10. By connecting the output of AND gate 188 to a reference clock sum term circuit 190 at fuse 192, the appropriate transitions will appear at the output of a respective OR gate 194. The output of reference clock OR gate 194 is coupled to reference clock output line 138 by a multiplexer 196. An architectural fuse 200 associated with multiplexer 196 is blown, so that the output from OR gate 194 is directly coupled to output line 138, bypassing flipflop or register 202. The "R" input of flipflop 202 is not used, and therefore OR gate 204 is disabled.

System clock 164 has a more complicated pulse train. Negative transitions are required at oscillator signal positive transitions 2 and 8, and positive transitions are required at oscillator transitions 6 and 0.

Product term lines or circuits 208 are programmed to yield a positive value when "1", "5", "7", "11", respectively, are counted by counter 24. These count values are intentionally one behind the desired output count values in order to take the one-pulse delay used up by synchronous output register 206. Product term circuits 208 are fed into respective AND gates 210, two of whose outputs are connected to sum term line or circuit 212, and the other two outputs of which are connected to sum term line or circuit 214. This pair of sum term circuits is coupled through OR gates 216 to the respective S and R inputs of output register 206. Since the architectural fuse 218 of the associated multiplexer 220 is left intact, multiplexer 220 will select for registered rather than unregistered output on system clock line 110. As output register 206 is used, a product term circuit 208 will be required to be programmed only for each count on which the system clock signal makes a transition, as S/R register 206 holds its present state until its inputs direct it to change. Otherwise, a product term line would be required for each oscillator positive transition.

In actual practice, clock generator 92 will have a further, peripheral clock output line (PCLK), for other timing controllers and peripherals throughout the system. In the illustrated embodiment, PCLK would be coded to operate at 2.5 megahertz at a 50% duty cycle. The programming for PCLK is not shown in FIG. 4, but would be accomplished in much the same way as the programming for SYSCLK.

The above example illustrates how a waveform generator can be built using the programming sequence generator of the invention. The two steps required to be taken for this application are:

(1) Programming the counter to reset to zero after the desired count length is reached; and
(2) Generating the logic equations to control the outputs from the present state of the binary counter.

Figure 5:
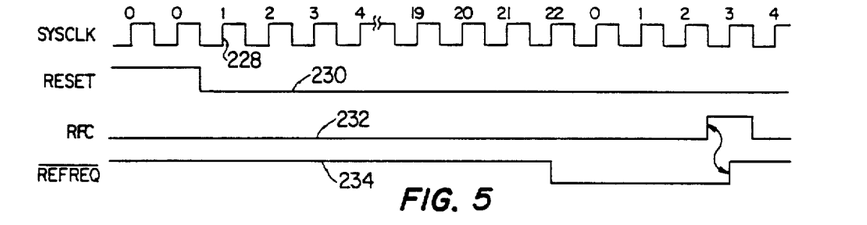
FIG. 5. is a timing diagram showing timing requirements for a refresh timer.

Referring now to FIG. 5, a timing diagram showing the timing requirements for a refresh timer is illustrated. The illustrated timing requirements are for a refresh timer that is similar to, although simplified from, the refresh timer 94 shown in FIG. 2.

A refresh timer is necessary because a dynamic memory, such as the DRAM banks 122a-d shown in FIG. 2, require each row of cells to be refreshed periodically. Where TMS4256 DRAM chips are used, one row should be refreshed at least once every 15.6 microseconds. With a five megahertz system clock, the timer should be set for a division rate of approximately 77 clock cycles. This condition will generate a refresh request ($\overline{REFREQ}$) every 15.4 microseconds. Memory controller 126 executes a refresh request immediately if it is not involved in an access cycle. If the memory controller is executing an access cycle, then the refresh request will not be honored until the access cycle is completed. The $\overline{REFREQ}$ output must remain low until the RFC signal has been received.

For purposes of explanation, a refresh timer will be described that is to send a $\overline{REFREQ}$ request signal every 22 system clock cycles, rather than every 77 system clock cycles as would be required by timer 94 in FIG. 2.

Figure 6:
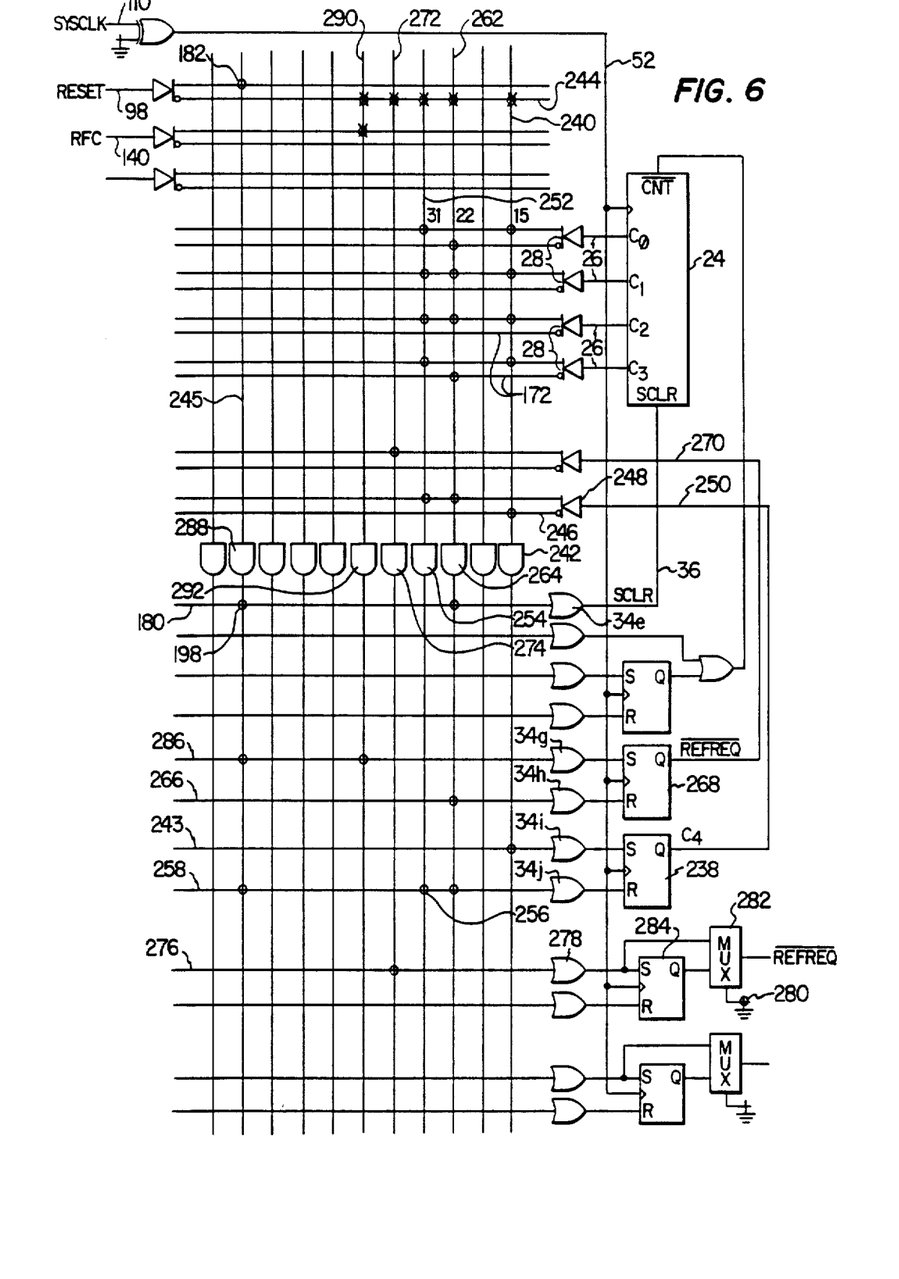
FIG. 6 is a simplified electrical schematic diagram of a programmable sequence generator according to the invention, as programmed for use as a refresh timer according to FIG. 5.

Referring now to FIG. 5, because the refresh request needs to be generated at least as often as every 22 system clock cycles, the binary counter 24 in FIG. 6 will need to be expanded by one bit in order to count beyond 15. This is accomplished by programming a maximum count product term circuit 240 to register a true condition at gate 242 upon a binary "15" being represented by count lines 28 and their complements 172. In order for gate 242 to have a positive output, C4 complement line 246, which is connected into maximum count product term circuit 240, must have a high value. When all the inputs into gate 242 are high, AND gate 242 will issue a high signal. The output of AND Gate 242 is in turn connected into a C4 sum term circuit 243, which in turn provides an input to a respective OR gate 34i, the output of which becomes the "S" input of a counter expansion state register 238. A high signal from AND gate 242 acts to store a "1" bit in register 238, which acts as a register for the most significant bit of the count.

The value of state register 238 is fed back to the product matrix via C4 feedback line 250. Feedback line 250 is inverted at 248 such that its complement 246 may be connected to maximum count product term line 240. The true C4 feedback 250 is connected into a second maximum count product term circuit 252, and also to a product term circuit 262 used to count up to "22". Counter product term circuit 252 is programmed such that all inputs into respective gate 254 are high when a "31" count is reached; that is, when the number represented on count lines 26 and their complements 172 is 15, and when feedback line 250 represents that the most significant bit of the count is a "1", a high output will appear at AND gate 254, assuming that the RESET signal is low. A high output from AND gate 254 will be transmitted through fuse 256 into sum term circuit 258, and from thence through OR Gate 34j to the "R" input of state register 238. This, in turn, will cause a "0" bit to be stored in state register 238, thus resetting the most significant bit of the counter.

Now that the counter has been expanded by one significant bit, the next step is to program it to count up to 22 and then to reset back to zero. This is done by programming product term circuit 262 to present high inputs at AND Gate 264 when a "22" is represented by count lines 26, their complements 172 and C4 feedback line 250. A high signal produced by AND gate 264 will be fed through synchronous clear (SCLR) OR Gate 34a and from there through line 36 to reset the counter 24.

Note that, in the above embodiment, the second maximum count line 252 would actually not be necessary, as the counter 24 is programmed to reset at count "22". The programming for second maximum count line 252 was described for purposes of illustrating how an expanded counter would be reset to zero in the absence of an earlier absolute resetting event.

The output of AND Gate 264 is also connected into a $\overline{REFREQ}$ sum term circuit 266. Sum term circuit or line 266 is connected through its respective OR gate 34h to the "R" input of a $\overline{REFREQ}$ state register 268. The value stored in state register 268 is fed back through feedback line 270 and through the product matrix to a product term circuit 272, which in turn is connected through AND gate 274 to a $\overline{REFREQ}$ output sum term circuit 276.

Since the refresh request output has been registered in state register 268, output register 284 is not required. Accordingly, output register 284 is bypassed by blowing fuse 280 of associated multiplexer 282, thus selecting for non-registered output on line 142. Through this series of connections, and assuming that RESET is low, a refresh request signal will be generated each time counter 24 counts up to 22.

The output of AND gate 264 is also connected to a C4 sum term circuit 258, which in turn is connected through OR gate 34j to the "R" input of state register 238. Thus, a "22" on product term line 262 will cause counter 24 to reset, and will cause the most significant bit stored in state register 238 to be reset as well.

When a high value of the Refresh Operation Complete (RFC) signal is received on input line 140, the refresh request signal output on line 142 must go high. Therefore, RFC signal input line 140 is connected into an RFC product term circuit 290. The remaining inputs of circuit 290, which are input into corresponding AND Gate 292, are disabled by being pulled high. The output of AND gate 292 is connected to sum term circuit 286, which in turn feeds through a respective OR gate 34g into the "S" input of $\overline{REFREQ}$ state register 268. Since the contents of $\overline{REFREQ}$ state register 268 control the output of output line 142, a high RFC signal together with a low RESET signal will in effect drive output 142 high.

Finally, whenever a RESET signal on line 98 goes high, the counter is to be reset and the refresh request line 142 driven high. Accordingly, RESET line 98 is connected to a reset product term line 245 at fuse 182. Product term line 245 is fed as an input into AND Gate 288, the remaining inputs thereof being pulled high. The output of AND Gate 288 is connected to SCLR sum term circuit 180, $\overline{REFREQ}$ sum term circuit 286, and C4 sum term circuit 258. These sum term circuits, when active, respectively clear counter 24, set the $\overline{REFREQ}$ bit stored in Register 268 to "1" and reset the most significant bit stored in C4 state register 238 to zero.

Figure 7:
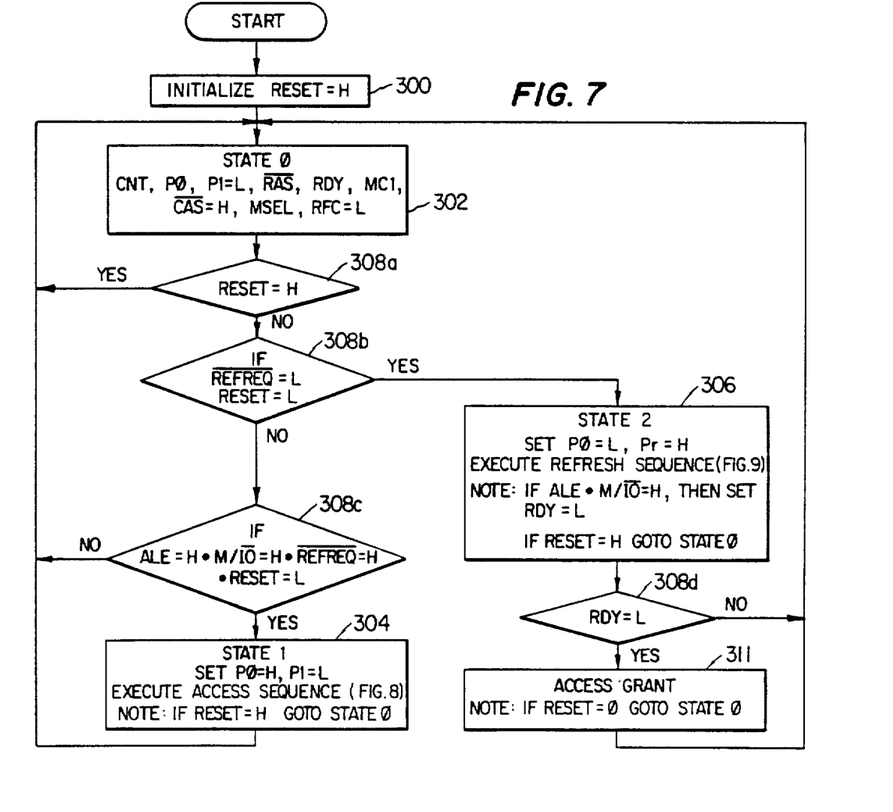
FIG. 7 is a flowchart for a dynamic memory timing controller, showing a transfer of control among a plurality of states.

Turning now to FIG. 7, a logic flowchart for the PSG as programmed as dynamic memory timing controller 96 (FIG. 2) is illustrated. After an initialization and reset Stage 300, during which RESET is set high, control is passed between three logic states according to certain conditions. First, control passes to a State 0 (302), which is an initialization and holding state. In State 0, the counter is reset and $P_0P_1$, two flag variables that together represent the current state, are set at 00 to represent State 0. The row address strobe, column address strobe, READY and MC1 outputs should be high, and the MSEL and RFC outputs should be held low. At decision block 308a, the RESET value is tested to see if it is high. If so, control is transferred back to State 0 (block 302). If not, control passes to decision block 308b, which asks whether both $\overline{REFREQ}$ and RESET are low, If they are, a refresh sequence indicated, and control is passed to State 2 at block 306. If $\overline{REFREQ}$ and RESET are not both low, decision block 308c next tests to see if ALE, M/$\overline{IO}$ and $\overline{REFREQ}$ are high, and RESET is low. If this condition is true, control passes to State 1, represented by block 304; if not, control passes back to State 0 at 302.

Once control is transferred to State 1 (304), a DRAM access sequence is executed. Flags $P_0P_1$ are set to 01 to represent State 1. An access sequence is executed, as will be described in connection with FIG. 8 below. If RESET goes high at any point, the access sequence is interrupted and control passes back to State 0 at 302.

In State 2 (306), $P_0P_1$ is set to 10 to represent State 2. A refresh sequence is executed, as will be described in connection with FIG. 9 below. If ALE and M/$\overline{IO}$ are both high, a READY signal (RDY) is set low. Once again, control is immediately transferred back to State 0 whenever RESET goes low.

Decision block 308d is reached after execution of the refresh sequence. If RDY is low, control is tranferred to an access grant sequence at 311. Control is tranferred from block 311 to block 302 at the end of the access grant or at any time RESET goes high.

Figure 8:
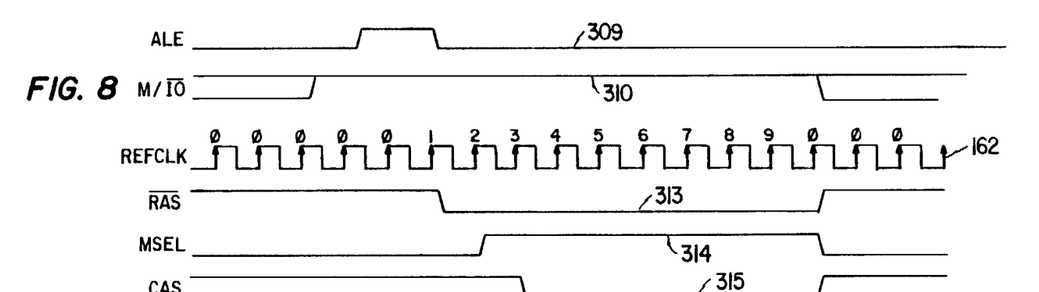
FIG. 8 is a timing diagram of the requirements for a dynamic memory timing controller configuration of the programmable sequence generator of the invention, as operating in a first state.

Referring now to FIG. 8, a timing diagram is illustrated for the inputs and the required outputs of the access cycle (State 1) of memory timing controller 96. For this access cycle, the dynamic memory timing controller 96 must look at the states of address latch enable (ALE) signal 309, memory/input-output (M/$\overline{IO}$) signal 310, and reference clock (REFCLK) signal 162. Two REFCLK cycles after both the ALE signal 309 and the M/$\overline{IO}$ signal go high, the row address strobe ($\overline{RAS}$) signal 313 goes low. Thereafter, multiplexer row/column select (MSEL) signal 314 goes high, and then, one count later, column address strobe ($\overline{CAS}$) signal 315 goes low. $\overline{RAS}$, MSEL and $\overline{CAS}$ then stay in these conditions for approximately 7 counts, at which time they revert to their previous conditions.

A comparison of the $\overline{RAS}$, MSEL and $\overline{CAS}$ outputs with the REFCLK signal shows that the $\overline{RAS}$, MSEL and $\overline{CAS}$ cycle within a ten-REFCLK-cycle period. Therefore, the sequences outputted in this access cycle should be referenced against a 10-count cycle.

Figure 9:
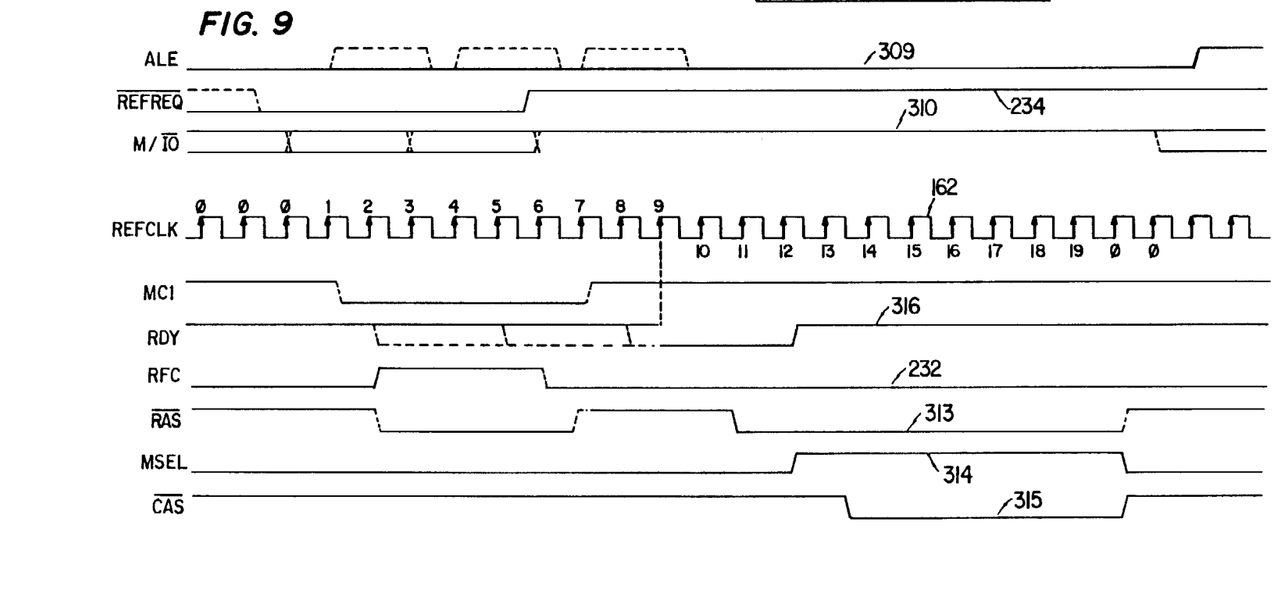
FIG. 9 is a timing diagram showing the requirements for the memory timing controller, as operating in a second state.

FIG. 9 shows a timing diagram for State 2, the refresh/access grant cycle. As shown, the outputs of the memory timing controller during this cycle repeat in a twenty-clock-cycle period as measured by REFCLK signal 162. A logical decision must be made between Count 9 and Count 10 of the REFCLK signal. If at Count 9 the RDY output signal 316 is low, the counter will continue counting and will execute the access grant sequence immediately following the refresh sequence (see also FIG. 7). If, on the other hand, RDY is high, the controller will clear the counter and return to State 0.

Figure 10:
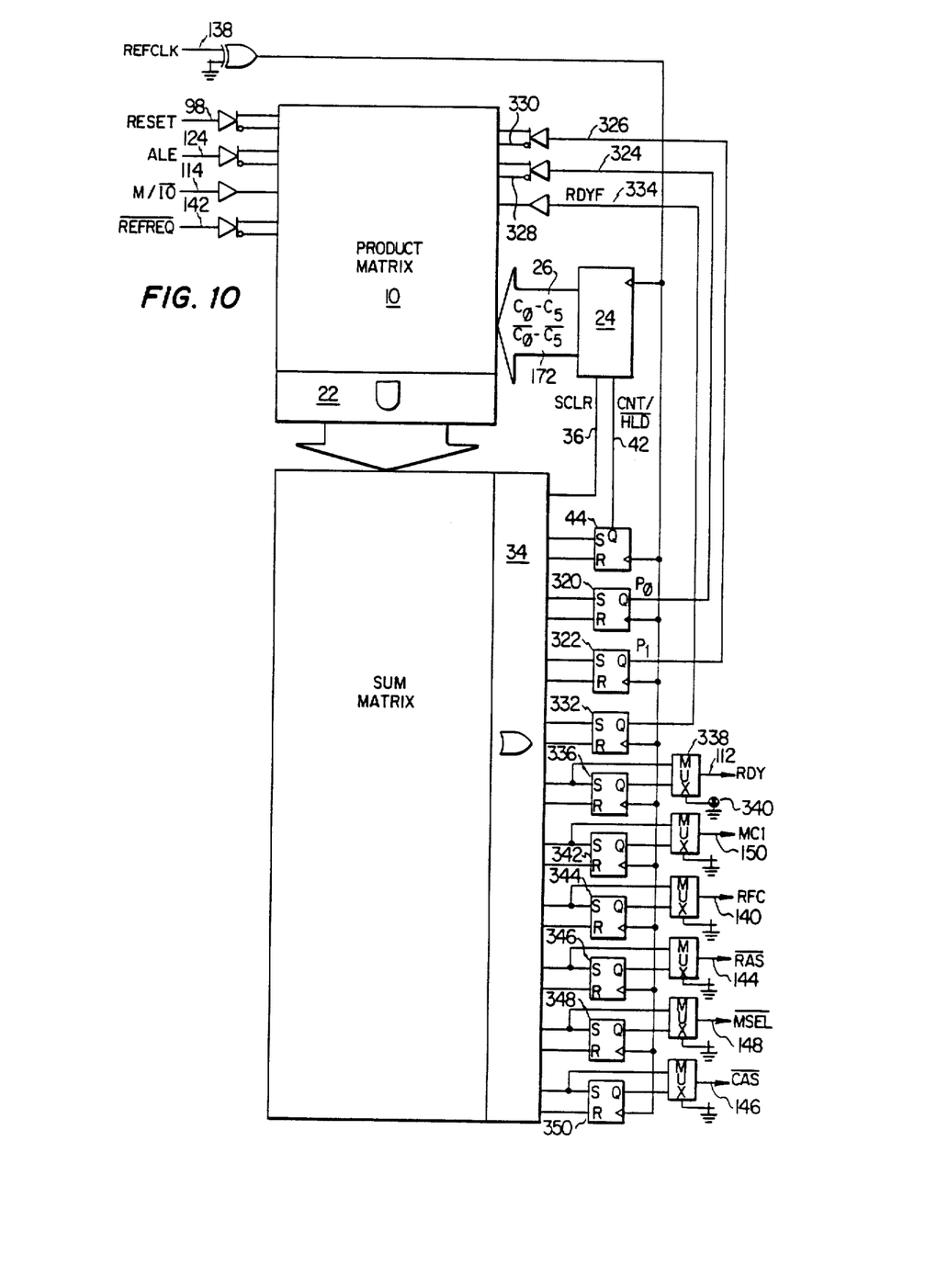
FIG. 10 is a simplified electrical schematic block diagram of a programmable sequence generator as programmed to perform as the memory timing controller specified in FIGS. 7-9.

A configuration of the programmable sequence generator that satisfies the requirements specified by FIGS. 7, 8 and 9 is shown diagramatically in FIG. 10. For clarity, the actual fuse map is not shown, but is instead represented by AND or product matrix 10, AND gates 22, OR or sum matrix 12, and OR gates 34.

AND or product matrix 10 has as its external inputs RESET line 98, ALE (address latch enable) line 124, M/$\overline{IO}$ (memory/input-output access select) line 114, and refresh request ($\overline{REFREQ}$) line 142. The complements of RESET, ALE and $\overline{REFREQ}$ are also used. Reference clock line 138 is used to advance the counter and control the registers. A 6-bit counter 24 is used, with six count lines 26 and their complements.

Several internal feedbacks and state registers are used in this configuration. A nonregistered synchronous clear line 36 is fed back to counter 24, as is a registered count/hold line 42 that is output from count/hold register 44. The functions of these signals have been previously described.

A $P_0$ state register 320 and a $P_1$ state register 322 together operate to store the present state of the memory timing controller. They operate together as a two-bit indicator of the state: "00" is State 0, "01" is State 1, and "10" is State 2. Registers 320 and 322 have respective output lines 324 and 326, which are fed back into product matrix 10. The complements of $P_0$ an $P_1$ are available to product matrix 10 on lines 328 and 330, respectively.

When $P_0P_1=01$, a ten-count (0-9) clock cycle is activated, as controlled by an appropriately programmed product term circuit (not shown). When $P_0P_1=10$, another ten-count clock cycle product term circuit is activated, which however requires a high value for RDYF (described below) to have it generate an SCLR signal on line 36. If RDYF=L, timer 24 will be controlled by a third count cycle product term circuit (not shown) that acts to clear counter 24 on count 19.

A third state register 332 stores a "ready" or "RDY" bit. A RDYF signal is fed back into the product matrix 10 via feedback line 334. RDYF line 334 is connected back into product matrix 10 and sum matrix 12 in such a manner as to directly couple a signal present on line 334 to a RDY sum term circuit output 336. RDYF is also connected to the second ten-count product term line, as above described. A multiplexer 338 associated with RDY sum term line 336 has its architectural fuse 340 blown, thereby selecting nonregistered output on RDY line 112. Therefore, the value stored in RDY state register 332 will directly control the output on line 112.

The remaining outputs are selected for registered operation by leaving the associated multiplexer architectural fuses intact. The registers include a MC1 register 342, RFC register 344, $\overline{RAS}$ register 346, MSEL output register 348, and $\overline{CAS}$ register 350. A product term in product matrix 10 is programmed for each transition of these signals. The product term and sum term equations necessary for programming product matrix 10 and sum matrix 12 into respective product term circuits and sum term circuits are set forth below in Tables I and II.

TABLE I

Memory Timing Controller Product Terms

| | RST |
|---|---|
| State 1 | $B = \overline{RST} \cdot \overline{P_0}P_1 \cdot C(19)$ |
| | $C = \overline{RST} \cdot \overline{P_0}P_1 \cdot C(12)$ |
| | $D = \overline{RST} \cdot \overline{P_0}P_1 \cdot C(11)$ |
| | $E = \overline{RST} \cdot \overline{P_0}P_1 \cdot C(10)$ |
| | $F = \overline{RST} \cdot \overline{P_0}P_1 \cdot C(6)$ |
| | $G = \overline{RST} \cdot \overline{P_0}P_1 \cdot C(5)$ |
| | $I = \overline{RST} \cdot \overline{P_0}P_1 \cdot C(1)$ |
| | $J = \overline{RST} \cdot \overline{P_0}P_1 \cdot C(0)$ |
| State 2 | $K = \overline{RST} \cdot P_0\overline{P_1} \cdot C(9)$ |
| | $L = \overline{RST} \cdot P_0\overline{P_1} \cdot C(2)$ |
| | $M = \overline{RST} \cdot P_0\overline{P_1} \cdot C(1)$ |
| | $N = \overline{RST} \cdot P_0\overline{P_1} \cdot C(0)$ |
| ST2 CNT | $O = \overline{RST} \cdot C(19)$ |
| | $P = \overline{RST} \cdot P_0P_1 \cdot C(9) \cdot RDYF$ |
| | $Q = \overline{RST} \cdot \overline{P_0P_1} \cdot \overline{REFREQ}$ |
| ST1 CNT | $R = \overline{RST} \cdot P_0\overline{P_1} \cdot C(9)$ |
| | $S = \overline{RST} \cdot \overline{P_0P_1} \cdot ALE \cdot M/\overline{IO} \cdot REFREQ$ |
| State 0 | $T = \overline{RST} \cdot \overline{P_0P_1}$ |
| Ready | $U = \overline{RST} \cdot \overline{P_0}P_1 \cdot ALE \cdot M/\overline{IO}$ |
| | $V = RDYF$ |

TABLE II

Memory Timing Controller Sum Terms

SCLRO = RST + O + P + R

CNT/$\overline{HLD}$(S) = RST + O + P + R

CNT/$\overline{HLD}$(R) = Q + S
$P_0(S) = S$
$P_0(R) = RST + O + P + Q + R$
$P_1(S) = Q$
$P_1(R) = RST + O + P + R + S$
RDYF(S) = RST + D + T
RDYF(R) = U
RDY(S) = V = RDYF
MCl(S) = RST + F + T
MCl(R) = J TABLE II-continued

| Memory Timing Controller Sum Terms |
|---|
| RFC(S)=I |
| RFC(R)=RST+G+T |
| RAS(S)=RST+B+F+K |
| RAS(R)=E+I+N |
| MSEL(S)=D+M |
| MSEL(R)=RST+B+K+T |
| CAS(S)=RST+B+K+T |
| CAS(R)=C+L |

In the above Tables, variables B through V and RESET variable RST each represent the output of a respective AND gate 22. C(n) is an abbreviation for the required state of count lines 26 and their complements; thus, $C(19)=C_0\bar{C}_1\bar{C}_2C_3C_4$, which term will be high when count lines 26 have $10011_2$ ($=19_{10}$) on their outputs.

These product terms are then used to form sum-of-product equations, as shown in Table II. Each equation represents a sum term line that, where registered, feeds into an input of an S/R register. Thus, RFC(R) is the sum term fed into the "R" input of RFC output register 344.

The above examples have been simplified, and in some cases, modified for purposes of clarity. For instance, in FIG. 4, separate product term lines 174 and 208 were used, even though both encode a count (11). Although separated for purposes of explanation, these two product terms can be combined, thus saving a product term line for other use.

In summary, a programmable sequence generator has been provided that provides an extremely flexible building block for a designer to form logic functions. For example, as is shown in the above detailed description, the programmable sequence generator of the invention can be variously configured to provide a waveform generator, a refresh timer, or a dynamic memory timing controller, among many other applications. The combination of an on-chip counter with the option for registered or nonregistered outputs makes the programmable sequence generator an extremely efficient logic chip, since only a minimum number of product term equations need be written.

ADVANTAGES OF THE INVENTION

A principal advantage of the invention is the provision of an extremely flexible logic chip that combines a programmable product matrix, a programmable sum matrix and a counter having inputs into the product matrix. A further advantage disclosed by the invention is the provision of state registers that allow the programmer to feed back output variables back into the matrix. A further advantage of the invention is the provision of architectural fuses on the outputs of the programmable sequence generator, whereby registered or nonregistered output may be selected. Still another advantage of the invention is the provision of a timer in connection with a programmable logic chip, whereby the minimum number of product term lines may be programmed in order to yield the desired result. Yet another advantage of the invention is the provision of a simple method of programming complicated logic and clocking sequences, whereby the sequences are each referenced to one or more count cycles. A further advantage of the invention is the provision of a logic chip that can be variously programmed as a waveform generator, a refresh timer, or a dynamic memory timing controller or other state machine. Yet another advantage of the invention is the provision of a field programmable logic chip having a built-in binary counter with synchronous clear and count/hold signal controls. A further advantage of the invention is an architectural fuse on the clock input to allow the designer to select on which edge the clock will trigger. Another advantage of the invention is the provision of state registers that can be programmed to expand the capacity of the built-in timer or provide other feedback programming options.

While a detailed description of several exemplary embodiments and attendant advantages has been set forth above, the invention is not limited to these, but rather to the invention as defined by the scope and spirit of the claims which follow.

What is claimed is:

1. A programmable sequence generator comprising:
   a programmable AND array receiving external and internal input signals and having product term output signals;
   a programmable OR array receiving as input selected ones of said product term output signals and having sum term output signals;
   a first plurality of state registers receiving as input first selected pairs of said sum term output signals and having first selected output signals coupled to said internal input signals of said AND array;
   a second plurality of state registers receiving as input second selected pairs of said sum term output signals and having second selected output signals coupled to output signals of said generator; and
   a counter receiving a input a first pair of control signals from a first selected pair of product term output signals and a second pair of control signals from a second selected pair of state registers, a series of selected output signals from said counter coupled to said internal input signals to said AND array.

2. The sequence generator of claim 1 wherein said counter is a binary counter.

3. The sequence generator of claim 1 wherein true or complement value of said external input, first selected output, second selected output and series of selected output signals from said counter may be selected for input to said AND array.

4. The sequence generator of claim 3 wherein said first pair of control signals includes a registered and an unregistered synchronous clear signal.

5. The sequence generator of claim 1 wherein said second pair of control signals includes a registered and unregistered count hold signal.

6. A programmable sequence generator comprising:
   a programmable AND array receiving an external set and an internal set of input signals, said external and said internal sets defining a set of sequence generator output control signals, said AND array having a first plurality of outputs;
   a programmable OR array receiving as inputs selected ones of said outputs from said AND array, said OR array having as output a first and a second group of control signals coupled to said internal set of input signals to said AND array and a third group of sum term output signals coupled to said sequence generator output control signals;
   a counter coupled between said first group of control signals and said internal set of input signals.

7. The sequence generator of claim 6 wherein said counter is a binary counter.

8. The sequence of claim 6 wherein said first group of control signals includes a registered and an unregistered synchronous control signal and a registered and an unregistered count hold signal.

9. The sequence generator of claim 6 wherein said second group of control signals is pairwise input to a plurality of registers, selected outputs of said registers coupled to said internal inputs of said AND array.

10. A method for generating a sequence of timing signals comprising:
   inputting a set of external logic control signals to a programmable AND array;
   inputting selected outputs of said AND array to a programmable OR array;
   generating a series of outputs from said programmable OR array;
   inputting a selected first group of paired outputs of said programmable OR array to a first associated group of registers;
   feeding back selected outputs of said first associated group of registers as a first set of internal logic control signals to said AND array;
   inputting a selected second group of paired outputs of said programmable OR array to a counter;
   generating a series of counter output signals as a second set of internal logic control signals to said AND array; and
   outputting a selected third group of outputs of said OR array as said sequence of timing signals from said generator.

11. The method of claim 10 wherein said selected second group of signals includes a registered and an unregistered synchronous control signal and a registered and an unregistered count hold signal.

* * * * *